US007149971B2

(12) United States Patent
Mudusuru

(10) Patent No.: US 7,149,971 B2
(45) Date of Patent: Dec. 12, 2006

(54) METHOD, APPARATUS, AND SYSTEM FOR PROVIDING MULTI-LANGUAGE CHARACTER STRINGS WITHIN A COMPUTER

(75) Inventor: Giri P. Mudusuru, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 431 days.

(21) Appl. No.: 10/610,037

(22) Filed: Jun. 30, 2003

(65) Prior Publication Data

US 2004/0268257 A1 Dec. 30, 2004

(51) Int. Cl.
*G06F 15/00* (2006.01)

(52) U.S. Cl. .................. 715/536; 715/535; 715/500.1; 704/2; 704/5; 704/8

(58) Field of Classification Search ................ 715/536, 715/535, 500.1; 704/2, 8, 5
See application file for complete search history.

(56) References Cited

U.S. PATENT DOCUMENTS

2001/0029455 A1* 10/2001 Chin et al. .................. 704/277
2002/0161569 A1* 10/2002 Itoh et al. ...................... 704/2
2003/0028366 A1* 2/2003 Redpath ........................ 704/3
2003/0126559 A1* 7/2003 Fuhrmann .................. 715/513

OTHER PUBLICATIONS

Lynx Studio Technology, "Lynx Studio Technology:Award BIOS Setup," Dec. 1, 2002, Lynx Studio Technology, <http://web.archive.org/web/20021201093332/http://www.lynxstudio.com/awardbios-setup.html>, pp. 1-5.*

* cited by examiner

*Primary Examiner*—Stephen Hong
*Assistant Examiner*—David Faber
(74) *Attorney, Agent, or Firm*—Hope Baldauff Hartman, LLC

(57) ABSTRACT

These systems and methods provide text displays, such as basic input/output system ("BIOS") text displays, that are represented by character strings in string definition files. In order to convert character strings into multiple languages, destination languages are either user selected or predetermined based on the display specifications. Next, the character strings are extracted from the string definition files in a source language into intermediate text files. Each intermediate text file represents a destination language. The source language character strings are then converted to the destination language of each intermediate text file. The converted character strings are then inserted from the intermediate text files into the string definition files from which the character strings in the source language were extracted. A file identifier of each string definition file from which the character strings were extracted is also stored in the intermediate text files. When the converted character strings are inserted into the string definition files, the file identifiers are utilized to locate the string definition files from which the character strings in the source language were extracted.

8 Claims, 11 Drawing Sheets

CONVERTED INTERMEDIATE TEXT FILES

16A

414A `<FILE>`
C:\Projects\Billings\Core\EM\USERFLSH\USERFLSH.ASD
`</FILE>`

416A `<STRING = str$_Scan_User_Flash_Area>`
`</LANG=ES>`
617A Analizar rea Flash Usuar.
`</LANG>`

416B `<STRING str$_Scan_User_Flash_Area_ HELP>`
`<LANG=ES>`
617B Permite al BIOS
analizar la Flash
ROM para los
Códigos binarios
`</LANG>`

414B `<FILE>`
C:Projects/Swvzo_a05_Mod\BSP\CPU\CPU.ASD
`</FILE>`
416C `<STRING= str$_CPUInfo>`
`<LANG=ES>`
Configure los Escenarios Avanzados de procesador
`</LANG>`
`<STRING= str$_CPU_Microcode_Updation>`
`<LANG=ES>`
Microcode Actualiza
`</LANG>`

16B `<LANG=FR>` 415 FRENCH

16C `<LANG=B5>` 417 CHINESE TRADITIONAL

STRING DEFINITION FILE AFTER INSERTION

10A `<COMMENT>`
TITLE USERFLASH.ASD _DPSD USER FLASH
AREA STRINGS
`</COMMENT>`
216A `<STRING = str$_Scan_User_Flash_Area>`
`<LANG=US>`
Scan User Flash Area
`</LANG>`
416A `<LANG=ES>`
617A Analizar rea Flash Usuar.
`</LANG>`
415A `<LANG=FR>`
String text
`</LANG>`
417A `<LANG=B5>`
String text
`</LANG>`
`</STRING>`

216B `<STRING= str$_Scan_User_Flash_Area_Help>`
`<LANG=US>`
Allows BIOS to scan
the Flash ROM for
user binaries
`</LANG>`
416B `<LANG=ES>`
617B Permite al BIOS
analizar la Flash
ROM para los
C ¢ digos binarios
`</LANG>`
415B `<LANG=FR>`
String text
`</LANG>`
417B `<LANG=B5>`
String text
`</LANG>`
`</STRING>`

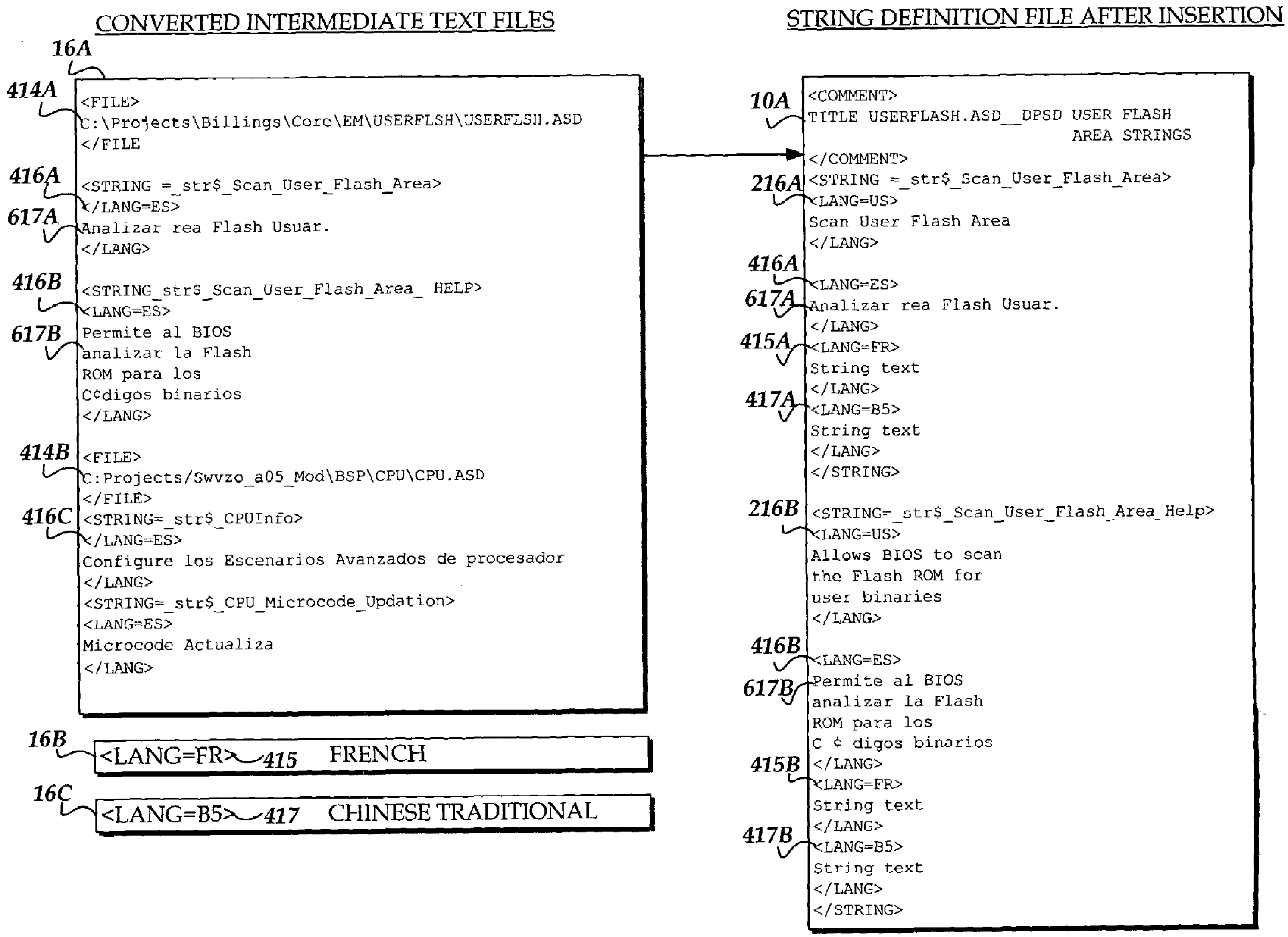

*Fig. 7A*

CONVERTED INTERMEDIATE TEXT FILES

16A

414A `<FILE>`
`C:\Projects\Billings\Core\EM\USERFLSH\USERFLSH.ASD`
`</FILE>`

416A `<STRING = str$_Scan_User_Flash_Area>`
`</LANG=ES>`
Analizar rea Flash Usuar.
`</LANG>`

416B `<STRING_str$_Scan_User_Flash_Area_ HELP>`
`<LANG=ES>`
Permite al BIOS
analizar la Flash
ROM para los
C digos binarios
`</LANG>`

414B `<FILE>`
`C:Projects/Swvzo_a05_Mod\BSP\CPU\CPU.ASD`
`</FILE>`

416C `<STRING= str$_CPUInfo>`
`</LANG=ES>`
617C Configure los Escenarios Avanzados de procesador
`</LANG>`

416D `<STRING= str$_CPU_Microcode_Updation>`
`<LANG=ES>`
617D Microcode Actualiza
`</LANG>`

16B `<LANG=FR>` — 415 FRENCH

16C `<LANG=B5>` — 417 CHINESE TRADITIONAL

STRING DEFINITION FILE AFTER INSERTION

10B CORE.ASD
`<COMMENT>`
This file contains all the things that
pertains to CPU.SSP
`</COMMENT>`

216C `<STRING = _str$_CPUINFO>`
`<LANG=US>`
Configure Advanced CPU settings
`</LANG>`

416C `<LANG=ES>`
617C Configure los Escenarios Avanzados de
procesador
415C `</LANG>`
`<LANG=FR>`
String text
417C `</LANG>`
`<LANG=B5>`
String text
`</LANG>`
`</STRING>`

214D `<STRING=_str$_CPU_Microcode_Updation>`
`<LANG=US>`
Microcode Updation
`</LANG>`

416D `<LANG=ES>`
617D Microcode Actualiza
415D `</LANG>`
`<LANG=FR>`
String text
417D `</LANG>`
`<LANG=B5>`
String text
`</LANG>`
`<STRING>`

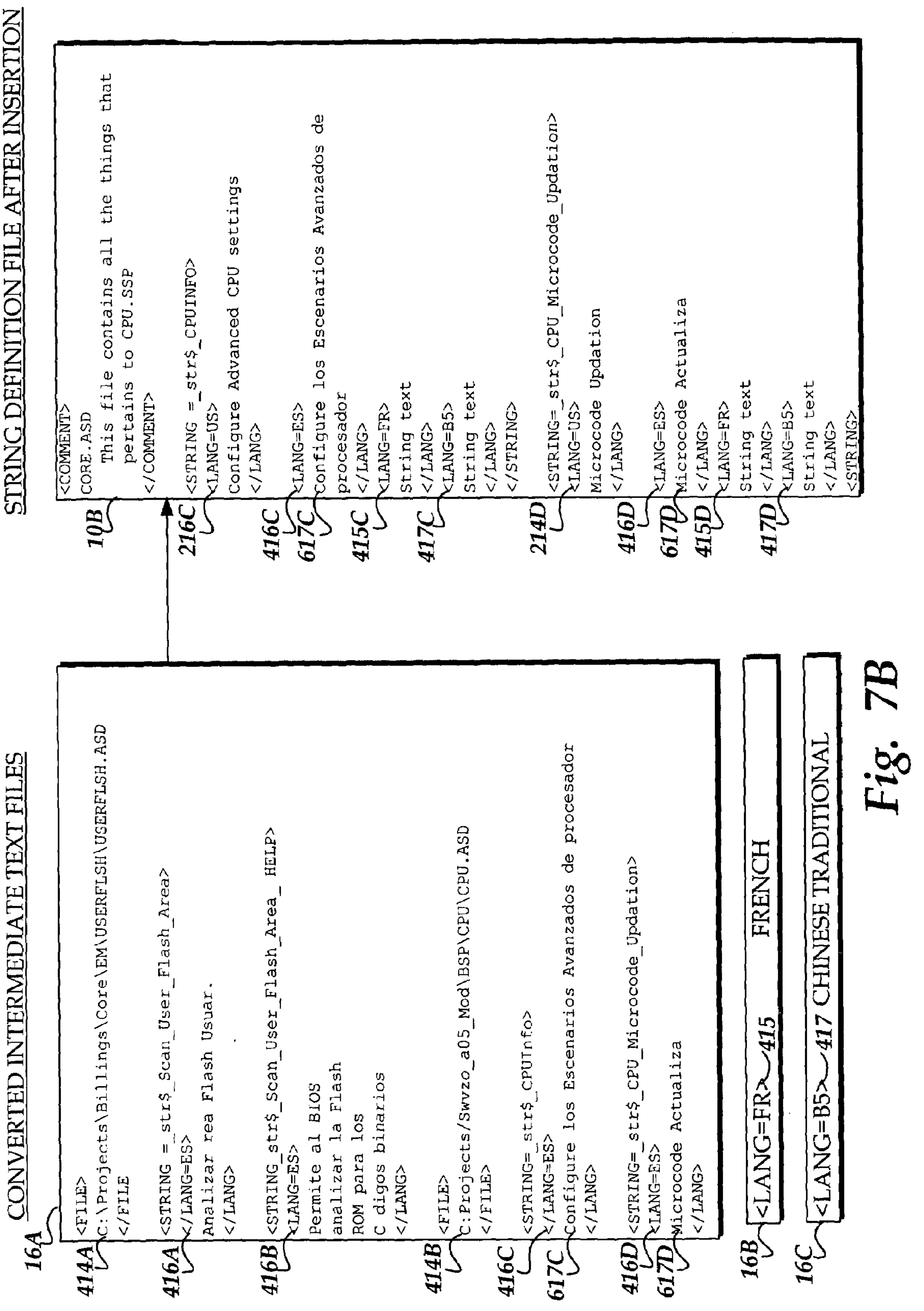

*Fig. 7B*

METHOD, APPARATUS, AND SYSTEM FOR PROVIDING MULTI-LANGUAGE CHARACTER STRINGS WITHIN A COMPUTER

TECHNICAL FIELD

The present invention is related to converting or translating character strings within a computer. More specifically, the present invention is related to providing multi-language character strings for use in text displays within a computer.

BACKGROUND OF THE INVENTION

Today many computer system and software manufactures include multiple language capabilities in the displays of their products in order to market to a multi-lingual customer base. In order to provide this type of functionality, the text shown in the screen displays must be converted to each language for which support is desired. The process of converting text displays to multiple languages can be time consuming, prone to errors, and costly for manufacturers. For instance, text displayed on a computer screen may be represented by a character string source file. Each source file represents a text display and defines the character strings within the text display for each language that may be displayed. In previous methods and systems, the source files for each display of the computer system are sent to a translator for each language enabled for display. Consequently, each source file is sent to many different translators to convert the character strings into different languages. Each translator manually adds the headers or language tags for each string in the numerous files and adds the converted string in place of a source language text. This process requires the manual viewing of many source files to locate the source language version of the character strings and manual conversion of the source language character strings to a new language. The translator copies each source language character string into conversion files. After being copied to conversion files, the source language character strings are converted from the source language version into the specified language for the translator.

After converting the character strings, the process of matching the converted strings of each conversion file with the original source files, from which the source language version of the converted character string originated, commences. In previous methods and systems this is a manual process that is very tedious and prone to errors. After each translator completes conversion of the source language character strings into new languages, the contents of each conversion file must be matched to the original source file from which the corresponding source language character strings originated. The contents of all these files must be manually viewed and, based on the file contents, matched and copied to the various source files. During this complicated process many original strings may be accidentally deleted or modified.

It is with respect to these considerations and others that the present invention has been made.

SUMMARY OF THE INVENTION

In accordance with the present invention, the above and other problems are solved by methods and systems for providing character strings in multiple languages within a computer. These systems and methods provide text displays, such as basic input/output system ("BIOS") text displays, that are represented by character strings in a string definition file. The systems and methods may be utilized within a project defined development environment or as a general desktop application. In order to convert character strings into multiple languages, one or more destination languages are either user selected or predetermined based on the display specifications. Next, the character strings, each having a unique string identifier or tag, are extracted from the string definition files in a source language, such as English. Upon extraction, the source language character strings are stored in intermediate text files. Each intermediate text file represents a destination language.

In accordance with other aspects, the source language character strings are converted to the destination language of each intermediate text file utilizing a translation module. In the alternative a human translator may translate the source language character strings. However, the human translator utilizing the present invention will not have to search and copy the pertinent characters strings from many source files as in previous systems. In accordance with the present invention the character strings are sorted and delivered to the translator in one intermediate text file instead of many source or string definition files, thereby saving time, costs, and reducing errors. The converted character strings are then inserted from the intermediate text files into the string definition files from which the character strings in the source language were extracted. It should be appreciated that at any stage of the operation the contents of the string definition or the intermediate text files may be displayed.

In accordance with other aspects, each string definition file from which the character strings are extracted has a file identifier that is also stored in the intermediate text files during extraction of the character strings. Each translator or translation module will now have only one file as opposed to numerous files for translation in the earlier implementation. Subsequently, when the converted character strings are inserted into the string definition file, the file identifiers are utilized to locate the string definition files from which the converted character strings in their source language were extracted. This enables the insertion of the converted character strings into the correct string definition file without manual sorting or being prone to errors.

In accordance with other aspects, the character strings extracted from the string definition files may include only the character strings currently not represented by one or more destination languages in the string definition files or all the character strings in the string definition files. Similarly, the character strings inserted into the string definition files may include only the converted character strings in the intermediate text files currently not represented by one or more destination languages in the string definition files or all the converted character strings in the intermediate text files. This removes unnecessary conversions and insertions, and improves efficiency of the process.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIGS. 7A–7B illustrate a block diagram containing syntax illustrating the insertion of converted character strings into string definition files according to an embodiment of the invention.

DETAILED DESCRIPTION

As described briefly above, embodiments of the present invention provide methods and systems for providing multi-language character strings within a computer. In the following detailed description, references are made to accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not to be taken in a limiting sense, and the scope of the present invention is defined by the appended claims and their equivalents.

Figure 1:
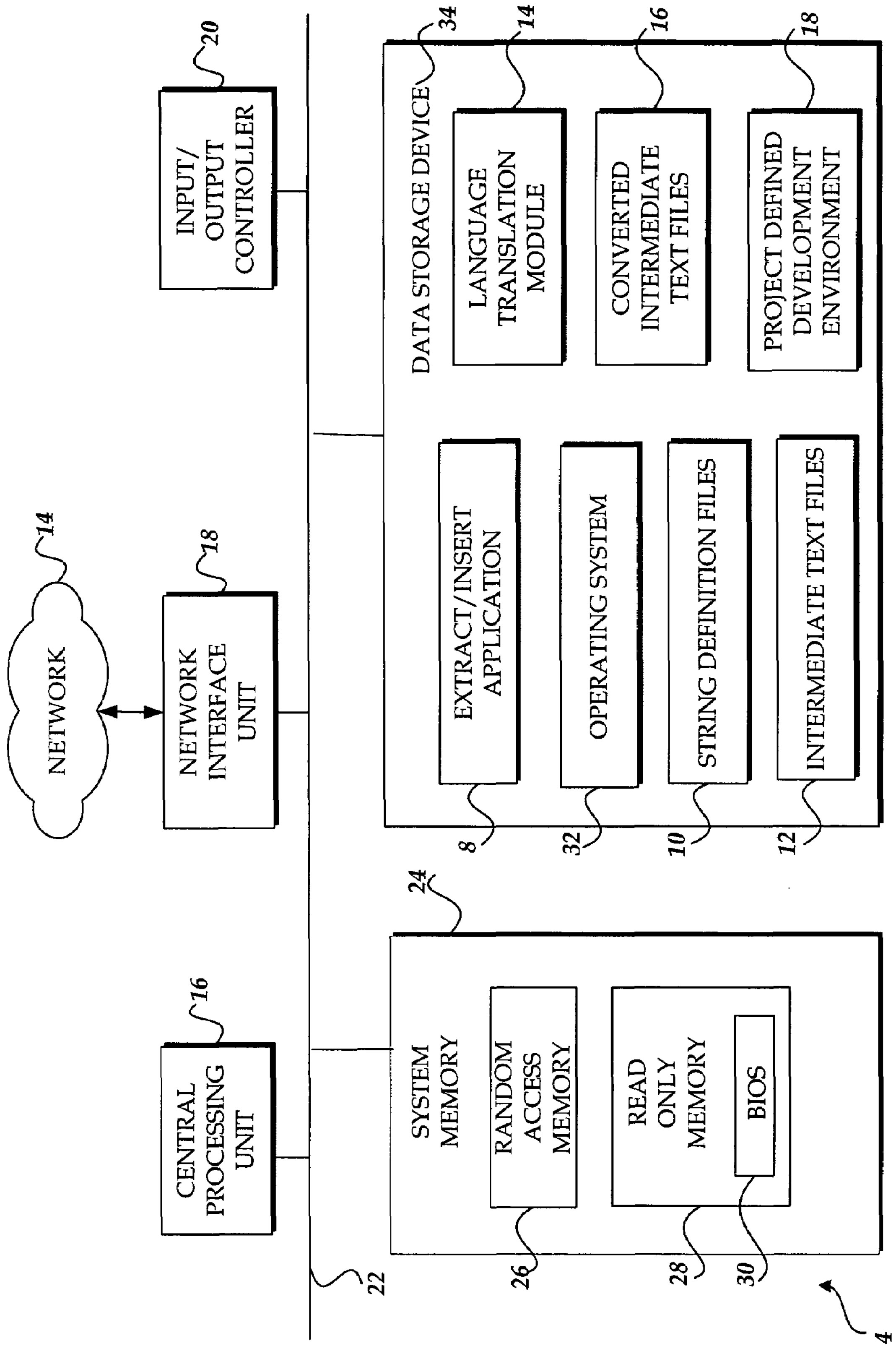
FIG. 1 illustrates a computer system architecture for providing multiple-language character strings within a computer utilized in embodiments of the invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the embodiments of the invention may be implemented. While the invention will be described in the general context of program modules that execute in conjunction with a BIOS development program that executes on a personal or server computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 4 for practicing the various embodiments of the invention will be described. The computer architecture shown in FIG. 1 illustrates a conventional server, or personal computer 4, including a central processing unit 16 ("CPU"), a system memory 24, including a random access memory 26 ("RAM") and a read-only memory ("ROM") 28, and a system bus 22 that couples the memory to the CPU 16. A basic input/output system ("BIOS") 30 containing the basic routines that help to transfer information between elements within the computer, such as during startup, is stored in the ROM 28. In accordance with an embodiment of the present invention, the BIOS 30 provides functionality for displaying text to the user in multiple languages within a computer 4. As will be described in greater detail below, the extract/insert application 8 may be used in a development environment to provide multi-language character strings to the BIOS 30 text displays. Additional details regarding the operation of the BIOS 30 and the extract/insert application 8 in this regard will be described below with respect to FIGS. 2–8.

The computer 4 further includes a data storage device 34 for storing an operating system 32, an extract/insert application 8, string definition files 10, intermediate text files 12, a language translation module 14, converted intermediate text files 16, and a project defined develop environment 18. The operating system 32 is suitable for controlling the operation of a networked computer, such as the WINDOWS NT or XP operating systems from MICROSOFT CORPORATION of Redmond, Wash. The extract/insert application provides support for processing character strings prior to and after translation. The string definition files 10 define the text of a display via character strings manipulated through string tags and language tags. The intermediate text files 12 each represent an available language and store the original file location or identifier and the source language version of the character strings prior to conversion by the language translation modules 14 or human translators. As the source language character strings are converted into destination languages, the converted character strings are stored in converted intermediate text files 16. The destination languages may be user-selected or predetermined based on a development project 18 environment or specification 18. Additional details regarding the capabilities of the extract/insert application 8 will be described below with respect to FIGS. 3A–3B.

The data storage device 34 is connected to the CPU 16 through a mass storage controller (not shown) connected to the bus 22. The data storage devices 34 and the associated computer-readable media, provide non-volatile storage for the computer 4. Although the description of computer-readable media contained herein refers to a data storage device such as a hard disk or CD-ROM drive, it should be appreciated by those skilled in the art that computer-readable media can be any available media that can be accessed by the computer 4.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer 4 may operate in a networked environment using logical connections to remote computers through a network 14, such as the Internet or a LAN. The computer 4 may connect to the network 14 through a network interface unit 18 connected to the bus 22. It should be appreciated that the network interface unit 18 may also be utilized to connect to other types of networks and remote computer systems. The computer 4 may also include an input/output controller 20 for receiving and processing input from a number of devices, including a keyboard, mouse, or electronic stylus (not shown in FIG. 1). Similarly, an input/output controller 20 may provide output to a display screen, a printer, or other type of output device.

Figure 2:
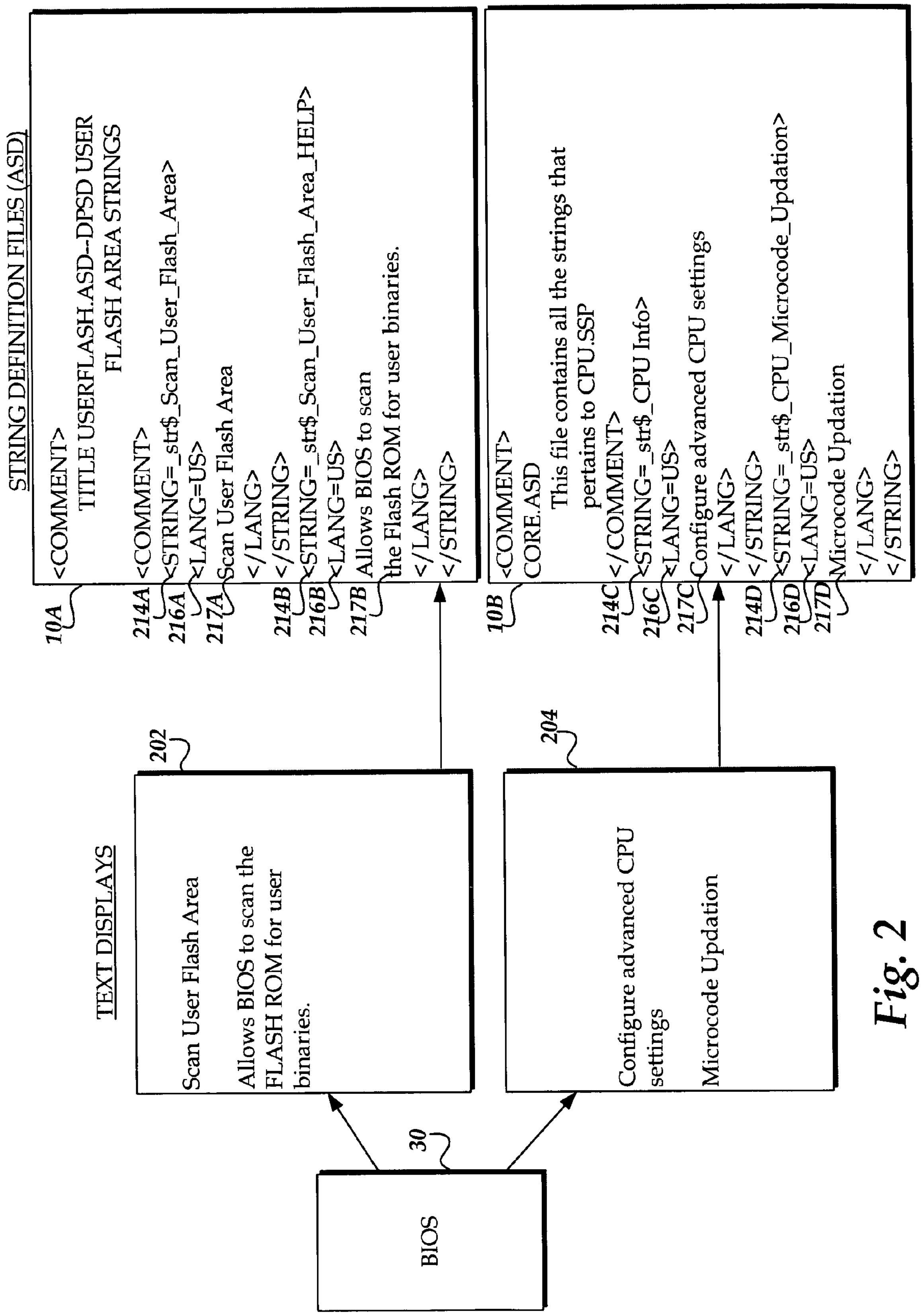
FIG. 2 illustrates a block diagram containing syntax illustrating how character strings within a BIOS text display are represented in a string definition file according to an embodiment of the invention.

Turning now to FIG. 2, a block diagram illustrating how character strings within BIOS 30 text displays are represented in string definition files 10 according to an embodiment of the invention will be described. Text displays for the BIOS 30 may be shown while utilizing the BIOS 30 setup utility or during a power on test procedure ("POST"). Two of the text displays 202/204 from the BIOS 30 are illustrated in FIG. 2. The text display 202 represents a display utilized for user flash and the text display 204 represents a display utilized for CPU 16 settings and updates. Those skilled in the art will recognize that the term flash refers to a type of non-volatile memory such as non-volatile random access memory ("NVRAM").

Different sections or displays of the BIOS 30 are stored in different string definition files. For instance, the string definition files 10A/10B represent the character strings and available languages utilized in the two different text displays 202 and 204. The display 202 is represented by the string definition file 10A where character strings are identified by string identifiers or tags 214A/214B, language identifiers or tags 216A/216B, and dummy strings 217A/217B. The string tags 214A–D identify the string format or title that is unique for each character string. The language tags 216A–D identify the currently available character string languages within the string definition files 10A–B. The dummy strings 217A–D display the actual text of the character string in the language identified by the language tags 216A–D.

Figure 3A:
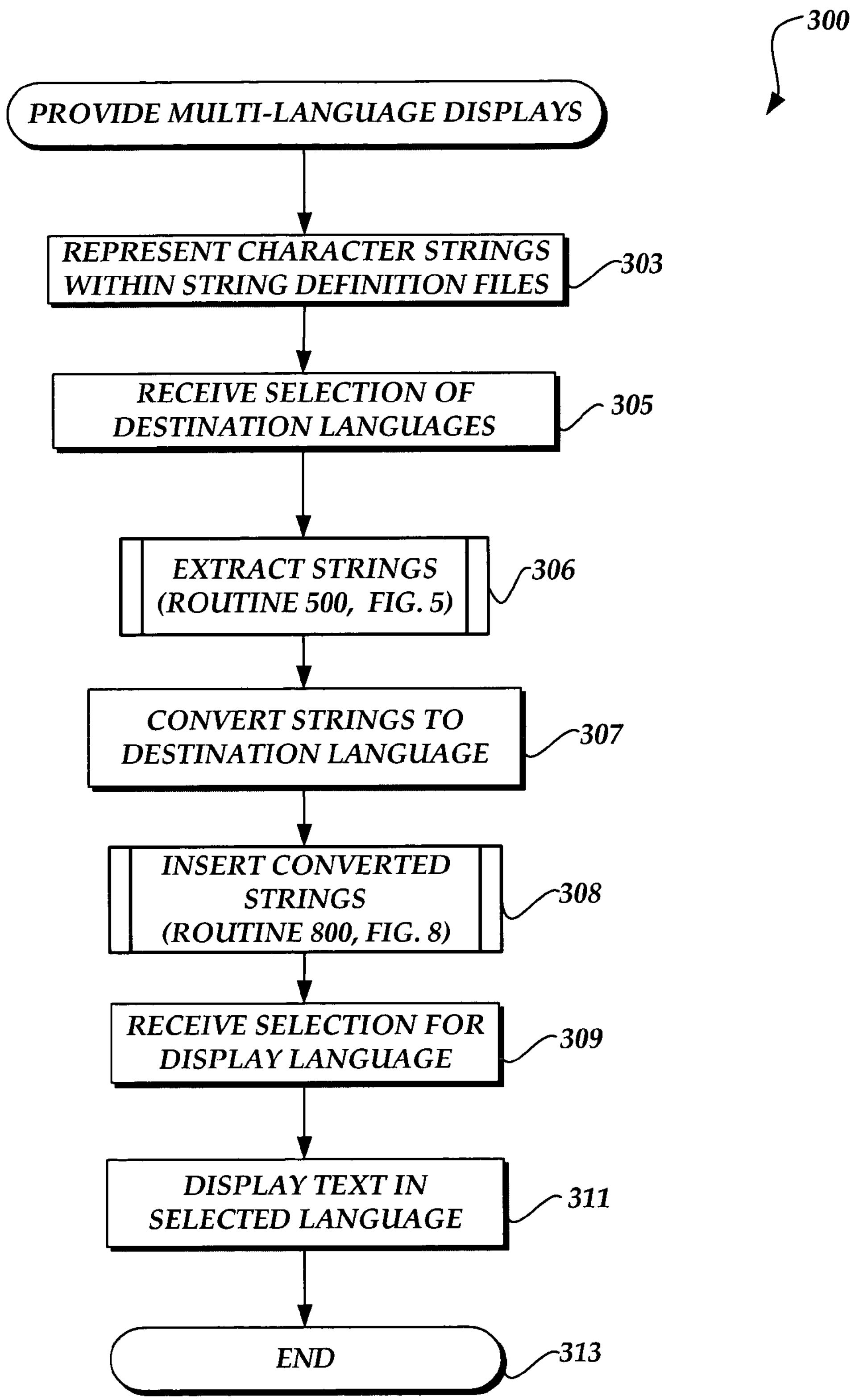
FIGS. 3A–3B illustrate an operational flow and screen display illustrating the context and functionality of a utility application for providing multi-language displays in embodiments of the invention.
Figure 5:
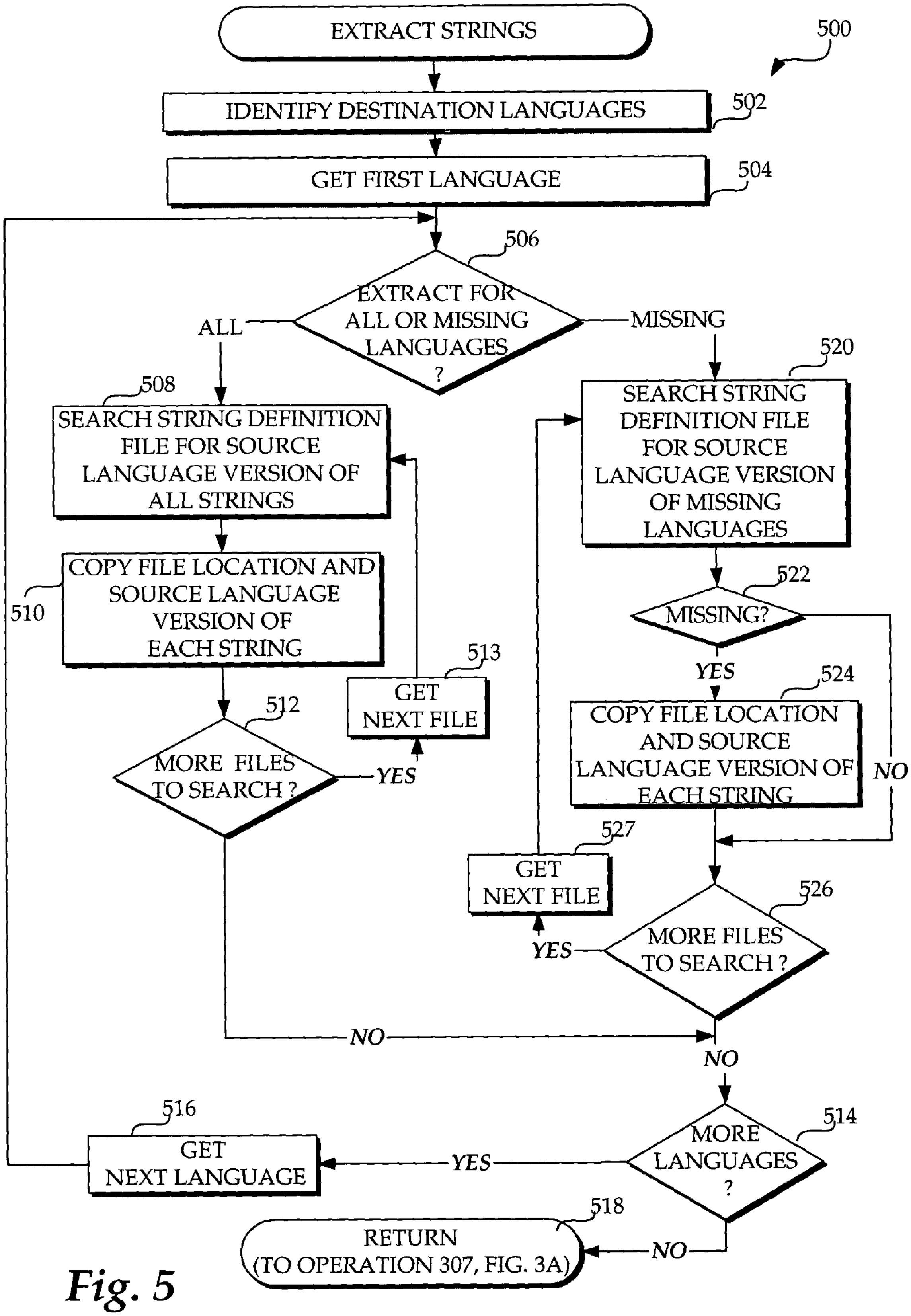
FIG. 5 illustrates an operational flow performed in extracting character strings from string definition files into intermediate text files according to an embodiment of the invention.
Figure 8:
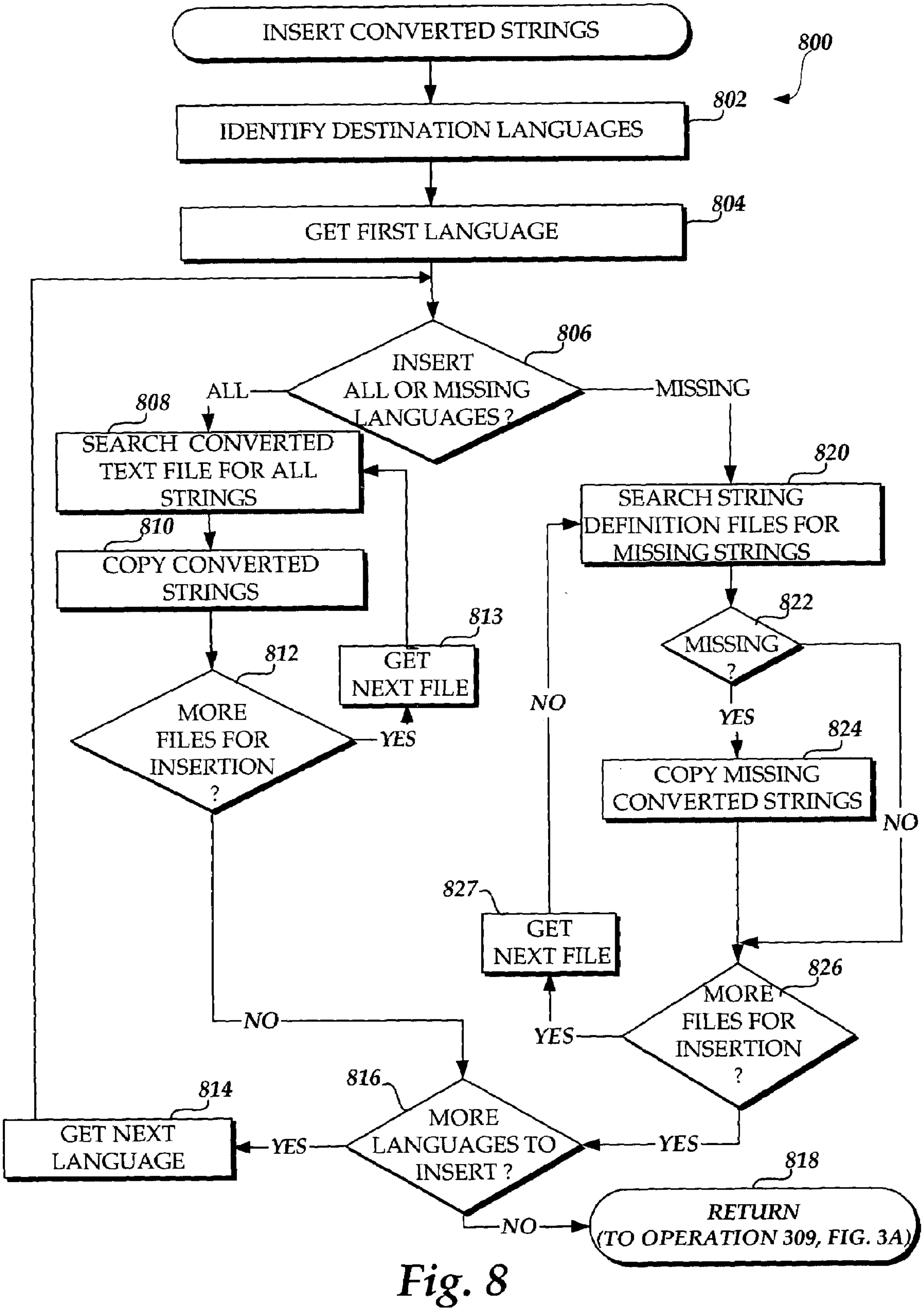
FIG. 8 illustrates an operational flow performed in inserting converted character strings into string definition files according to an embodiment of the invention.

FIGS. 3A, 5, and 8 show illustrative operational flows or logical operations performed in the computer system 4 described above in FIG. 1 for providing multi-language text displays according to various embodiments of the invention. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 3B:
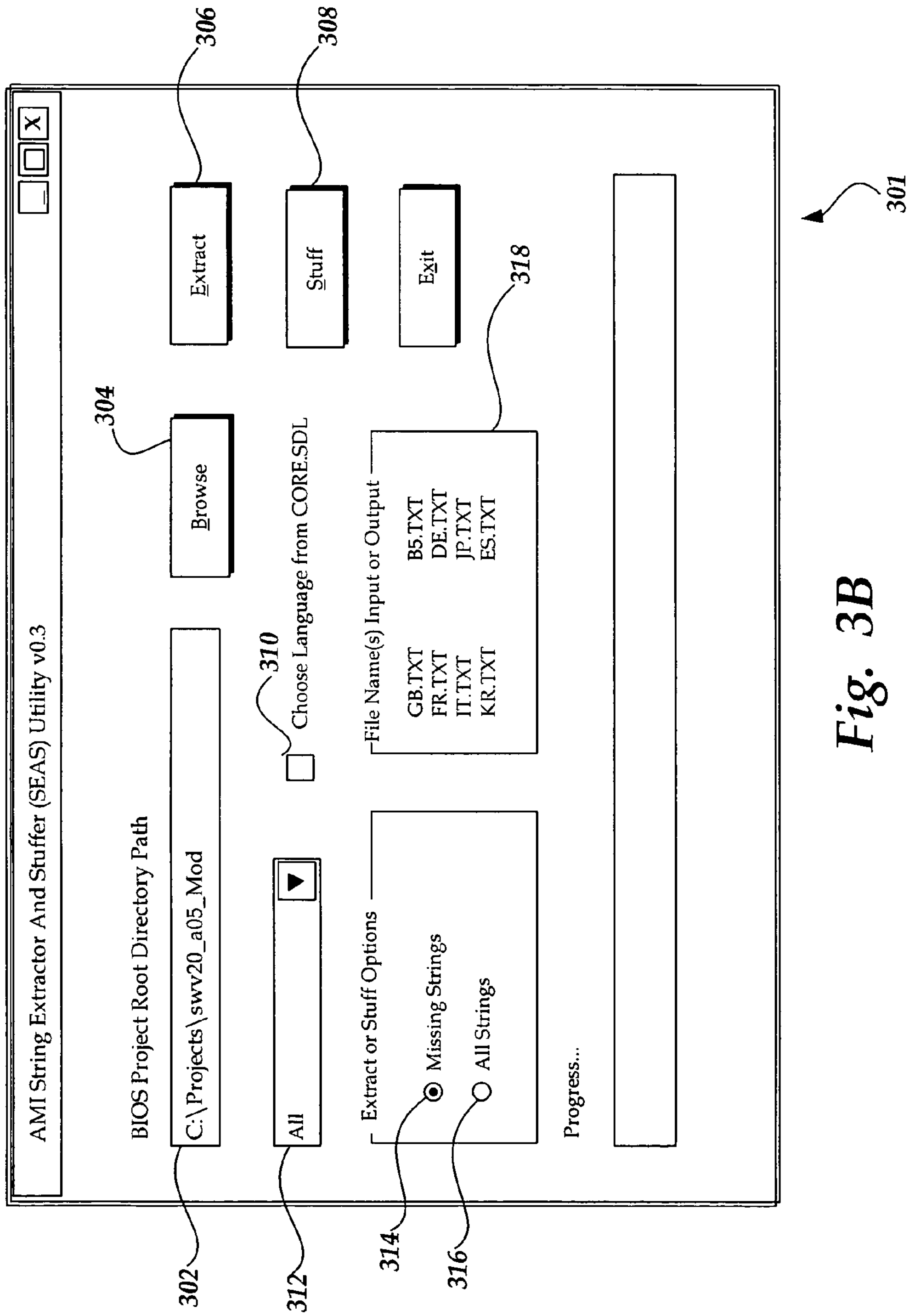

FIGS. 3A–3B show an operational flow and screen display, respectively, illustrating the context and functionality of an application for providing multiple-language displays in an embodiment of the invention. Turning now to FIG. 3A, an illustrative routine 300 will be described for providing multi-language text displays within a computer. The routine 300 begins at operation 303 where the character strings within the text displays are represented within string definition files 10. Each character string is represented in the string definition file 10 with a unique string identifier 214. From operation 303, the routine 300 continues to operation 305 where a designation or selection of destination languages is received. The destination languages may be user-selected as a group or individually. In the alternative, the destination languages may be predetermined based on specifications for a customized developer project.

From operation 305, the routine 300 continues to operation 306 where the character strings in a source language, such as English, are extracted from the string definition files 10 into intermediate text files 12. Each intermediate text file 12 extracted into represents a destination language received in operation 305. Additional details regarding the extraction operation 306 will be described below with respect to FIGS. 3B, 4, and 5.

From operation 306, the routine 300 continues to operation 307 where the character strings in the intermediate text files 12 are converted to the destination languages via a language translation module 14 or a human translator. After translation, the intermediate text files 12 become converted intermediate text files 16, now containing the translated version of the character strings.

Next, the routine 300 continues to operation 308 where the converted character strings are inserted or stuffed from the converted intermediate text files 16 into the string definition files 10 from which the source language version of the character strings originated. Additional details regarding insertion operation 308 will be described below with respect to FIGS. 3B, 7A–7B, and 8. It should be appreciated that a file identifier, stored in the intermediate text file upon extraction, identifies which string definition file 10 and thus text display from which the source language version of the character string originated. Thus, upon insertion the file identifier identifies which file to insert the converted character strings. Additional details regarding the file identifier will be described below with respect to FIGS. 4 and 5.

From operation 308, the routine 300 continues to operation 309 where a selection or designation for a display language is received. This operation may be accomplished via a setup utility. For instance, after character strings in Spanish have been inserted into the string definition files, a user may designate Spanish as the display language instead of English. After a display language is designated, the routine 300 continues to operation 311 where the display text is shown in the designated language. The routine 300 then terminates at end operation 313.

Turning now to FIG. 3B, an illustrative screen display 301 shown by the computer 4 and illustrating the functionality of a utility application for providing multi-language displays within a BIOS 30 development project in an embodiment of the invention will be described. The project path 302 displays the BIOS project that is currently being accessed. The developer may enter the path directory or select the browse function 304 to select from a list of currently available BIOS 30 projects. Next, a language may be designated from language menu 312. In this case, all of the available destination languages have been designated as shown by the word "ALL" in the language menu 312. A user may also select the languages individually or as a group from the language menu 312. In the alternative languages may be designated by checking the core file box 310. The core file box 310 indicates that the destination languages are chosen from a core file of the BIOS 30 project that stores the predetermined language selections for the project.

The intermediate text files 12/16 for each designated destination language are displayed in text file display 318. In this case the available languages include: Chinese Simplified (GB), Chinese Traditional (B5), French (FR), German (DE), Italian (IT), Japanese (JP), Korean (KR), and Spanish (ES). The text file display 318 shows the intermediate text files for output during the extract operation 306 and for input during the insert or stuff operation 308.

Furthermore, there are extract/stuff option indicators 314 and 316. If option indicator 314 is marked during the extract operation 306, only the character strings that are not represented by the designated destination languages in the string definition files 10 will be extracted. If option indicator 314 is marked during the insert operation 308, only the converted character strings that are not represented in the string definition files 10 will be inserted from the converted intermediate text files 16 into the string definition files 10.

If option indicator 316 is marked during the extract operation 306, all the character strings in the string definition files 10 regardless of whether are already represented in the destination language will be extracted. If option indicator 316 is marked during the insert operation 308, all the converted character strings, regardless of representation in the string definition files 10, will be inserted from the converted intermediate text files 16 into the string definition files 10.

Figure 4:
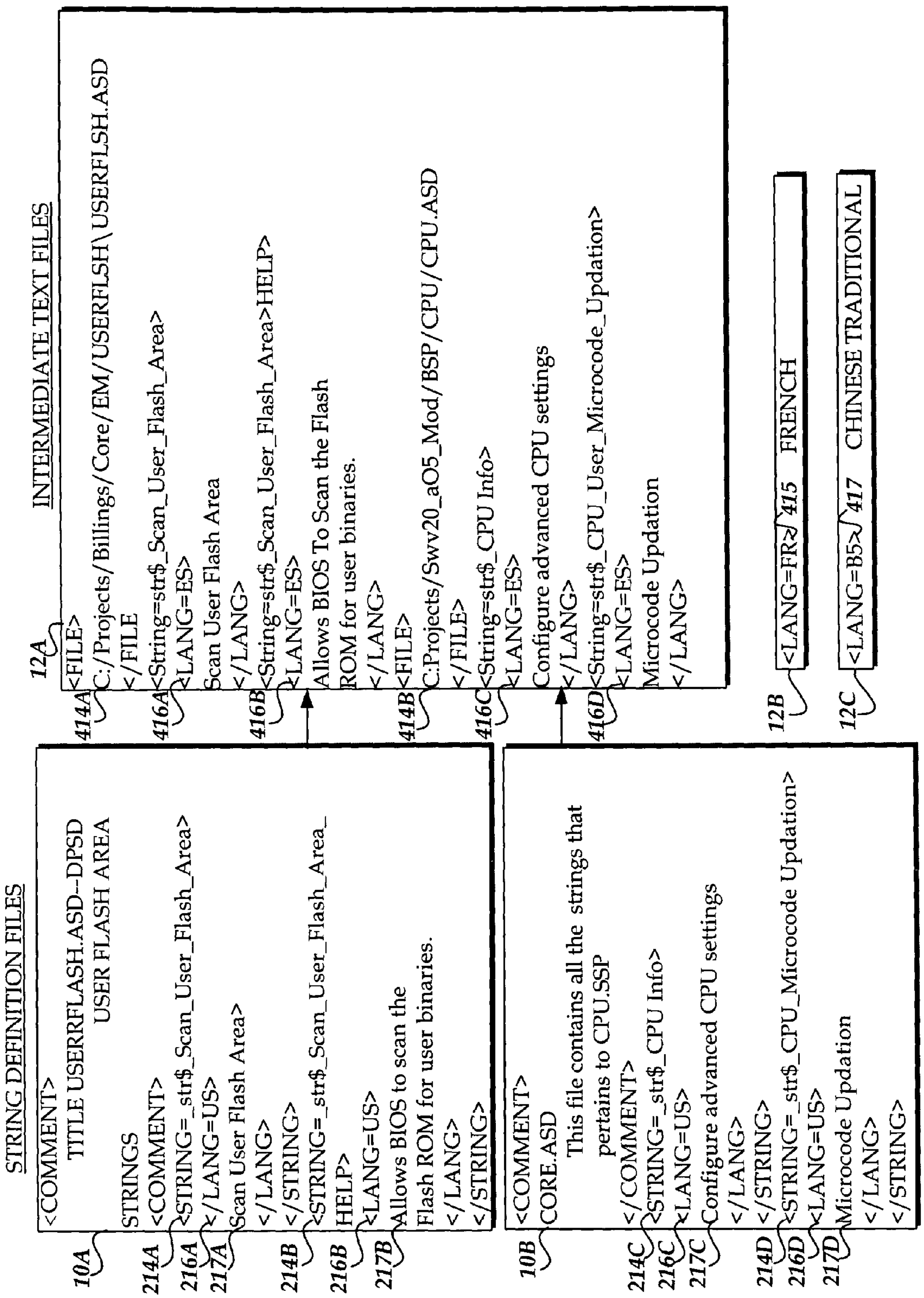
FIG. 4 illustrates a block diagram containing syntax illustrating how character strings, after being extracted from string definition files, are represented in an intermediate text file for each language according to an embodiment of the invention.

Turning now to FIG. 4 a block diagram containing syntax illustrating how character strings, after being extracted from string definition files, are represented in an intermediate text file for each language according to an embodiment of the invention will be described. As shown in FIG. 2 each string definition file 10A/10B represents the character strings and available languages of a text display 202/204. Upon extraction the character strings in a source language are copied to the intermediate text files 12A, 12B, and 12C. There is one intermediate text file for each language. In this embodiment the designated languages are Spanish (ES), French (FR), and Chinese Traditional (B5), each represented by an intermediate text file.

Also stored in each intermediate text file is a file identifier 414 for each string definition file 10 from which character strings in a source language originated. The file identifier 414A represents the string definition file 10A and the file identifier 414B represents the string definition file 10B. As shown with regard to the language tags 416A–D within the intermediate text file 12A, the language designation has changed to Spanish (ES). Assuming an option indicator 316 being marked or the all character strings for the three languages are missing from the string definition files with an option indicator 314 being marked, duplicate contents reside in the intermediate text files 12B and 12C except the language tags 415 and 417 respectively represent the languages French (FR) and Chinese traditional (B5). It should be appreciated that at any stage of the operation the file contents may be displayed.

Turning now to FIG. 5, an operational flow performed in extracting character strings from string definition files according to an embodiment of the invention will be described. The routine 500 begins at operation 502, where destination languages are identified based on designations from a user or predetermined from a core file. Next, the routine 500 continues to operation 504 where operations to extract character strings for the first language are initiated.

Next, the routine 500 proceeds to operation 506 where a determination is made as to whether all or only character strings missing in the designated languages are to be extracted from the string definition files 10. If all strings are to be extracted, the routine 500 continues to operation 508 where a string definition file is searched for the source language version of all the character strings represented in the text display. Upon locating the source language versions, the routine 500 then continues from operation 508 to operation 510. At operation 510 the file identifier 414 and the source language versions of all the character strings in the string definition files 10 are copied to an intermediate text file 12 for the designated language.

Next, the routine 500 continues to operation 512 where a determination is made as to whether more string definition files 10 are available to search. If more files are available to search, the routine 500 continues to operation 513 where the next string definition file is designated. The routine 500 then returns to operation 508 described above. If all the files have been searched, the routine 500 continues to operation 514 where a determination is made as to whether more destination languages are to be extracted. If not the routine 500 terminates at operation 518. If more languages are to be extracted the routine 500 continues to operation 516 where the next language for extraction is designated. The routine 500 then branches back to operation 506 described above.

If only missing strings are to be extracted at operation 506, the routine 500 continues from operation 506 to operation 520. At operation 520, a string definition file 10 is searched for source language versions of character strings in the text display that are not represented by language tags and character strings for the current designated language. The routine 500 then continues to operation 522 where a determination is made as to whether there are missing or blank character strings for the current designated language. If character strings for the current designated language are missing, the routine 500 continues to operation 524 where the file identifier and the source language versions of the missing character strings are copied to the intermediate text file 12 for the language currently designated. The routine 500 then continues to operation 526 described below.

If there are no missing character strings, the routine 500 continues from operation 522 to operation 526. At operation 526 a determination is made as to whether more string definition files 10 are available to search. If more files are available to search, the routine 500 continues to operation 527 where the next string definition file is designated. The routine 500 then returns to operation 520 described above. If all the files 10 have been searched, the routine 500 continues to operation 514 where a determination is made as to whether more destination languages are to be extracted. If not the routine 500 terminates at operation 518. If more languages are to be extracted the routine 500 continues to operation 516 where the next language for extraction is designated. The routine 500 then branches back to operation 506 described above.

Figure 6A:
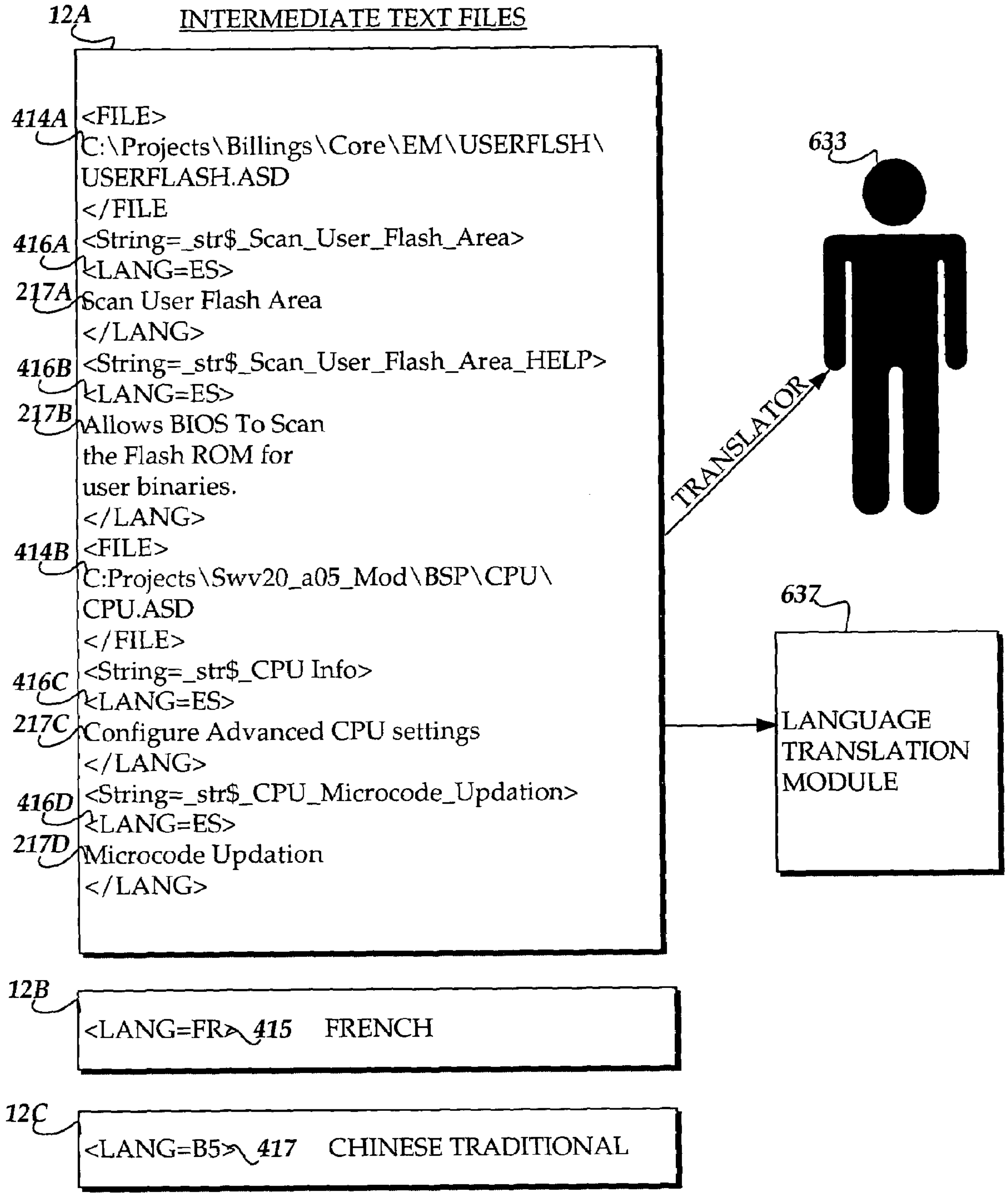
FIGS. 6A–6B illustrate a block diagram containing syntax illustrating a conversion of source language character strings into another language via a language translator or translation module according to an embodiment of the invention.
Figure 6B:
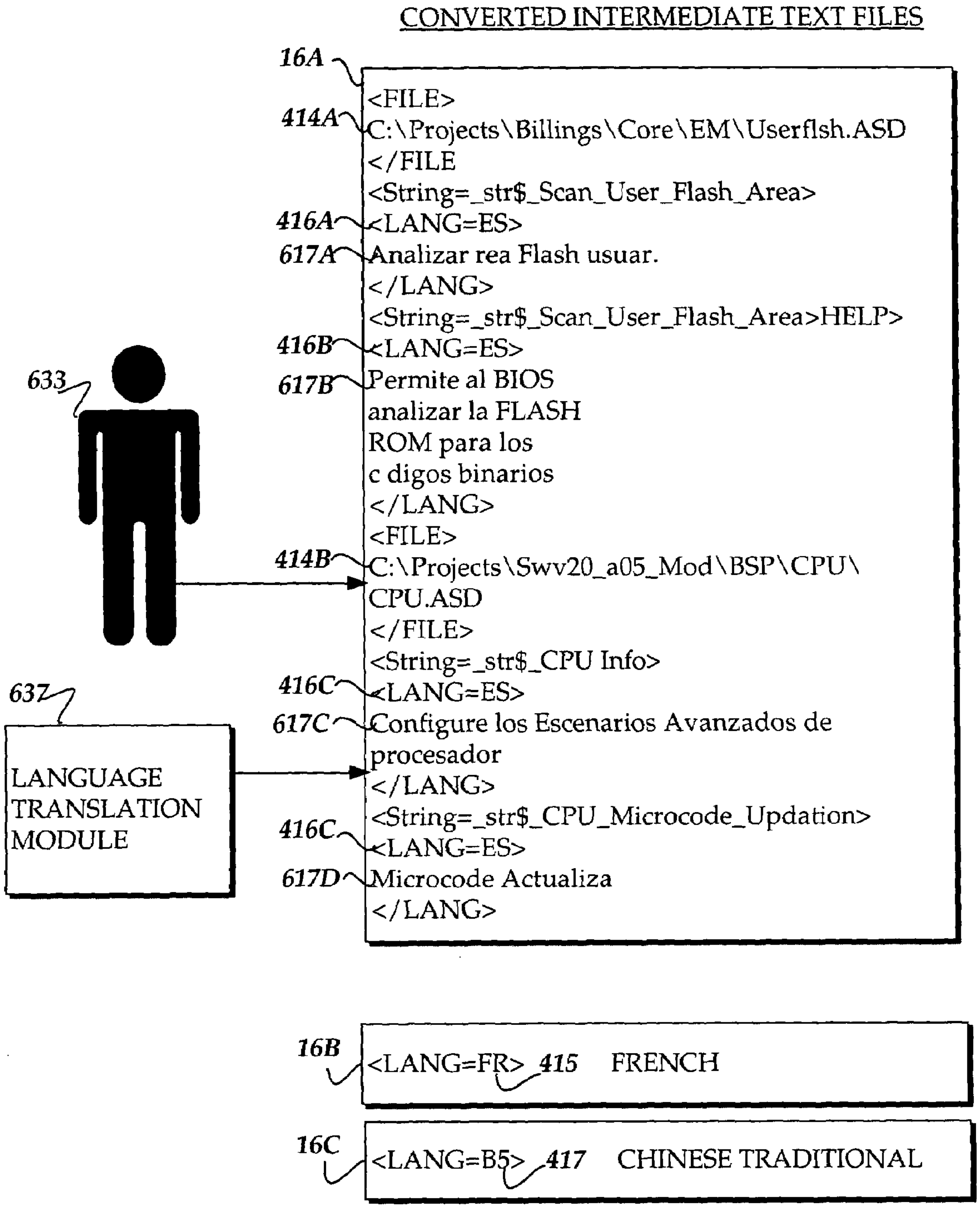

Turning now to FIGS. 6A–6B a block diagram containing syntax illustrating a conversion of source language character strings into another language via a language translator or translation module according to an embodiment of the invention will be described. Intermediate text file 12A contains syntax language tags 416A–B for file identifier 414A representing the string definition file 10A and language tags 416C–D for the file identifier 414B representing string definition file 10B. As shown from the language tags 416, the intermediate text file 12A is for storing Spanish (ES) translations of the source language version of the character strings. The contents of intermediate text files 12B and 12C are identical to the contents of the file 12A with the exception of the language tags. The text file 12B contains language tags 415 for French (FR) and the text file 12C contains language tags for 417 for Chinese traditional (B5). The intermediate text file 12A is sent to the language translation module 637 where the dummy strings 217A–D are converted to the language of the intermediate text file. In the alternative, the intermediate text file may be sent to a human translator 633 who can manually translate the dummy strings 217A–D.

Referring now to FIG. 6B, after translation, the intermediate text file 12A emerges as the converted intermediate text file 16A containing the Spanish (ES) versions 617A–D of the source language dummy strings 217A–D. Similarly, after translation, the intermediate text files 12B and 12C will emerge as the converted intermediate text files 16B and 16C containing the French (FR) and Chinese traditional (B5) translations of the dummy strings 217A–D.

Turning now to FIGS. 7A–B a block diagram containing syntax illustrating the insertion or stuffing of converted character strings into string definition files according to an embodiment of the invention will be described. In FIG. 7A, the converted character strings 617A and 617B, associated with the file identifier 414A, are inserted from the converted intermediate text file 16A into the string definition file 10A. As indicated from the file identifier 414A, the string definition file 10A is where the source language versions of the converted character strings 617A–B originated.

After insertion, the string definition file 10A contains language tags 416A–B for Spanish (ES) and Spanish character strings 617A–B. Similarly, after insertion, the string definition file 10A contains the French (FR) language tags 415A–B and the French (FR) character strings (not shown), along with the Chinese traditional (B5) language tags 417A–B and the Chinese traditional (B5) character strings (not shown).

In FIG. 7B, the converted character strings 617C and 617D, associated with the file identifier 414B, are inserted from the converted intermediate text file 16A into the string definition file 10B. As indicated from the file identifier 414B, the string definition file 10B is where the source language versions of the converted character strings 617C–D originated.

After insertion, the string definition file 10B contains language tags 416–D for Spanish (ES) and Spanish character strings 617C–D. Similarly, after insertion, the string definition file 10B contains the French (FR) language tags 415C–D and the French (FR) character strings (not shown), along with the Chinese traditional (B5) language tags 417C–D and the Chinese traditional (B5) character strings (not shown).

Turning now to FIG. 8, an operational flow performed in inserting converted character strings into string definition files according to an embodiment of the invention will be described. The routine 800 begins at operation 802, where destination languages are identified based on designations from a user or predetermined from a core file. Next, the routine 800 continues to operation 804 where operations to insert character strings for the first language are initiated.

Next, the routine 800 proceeds to operation 806 where a determination is made as to whether all or only character strings missing in the designated languages are to be inserted into the string definition files 10. If all strings are to be inserted, the routine 800 continues to operation 808 where a converted text file is searched for the character strings associated with the file identifier 414 for the string definition file 10 receiving the insertion. Upon locating the associated character strings, the routine 800 then continues from operation 808 to operation 810. At operation 810 the associated character strings in are copied from an intermediate text file 12 for the designated language to the string definition file 10.

Next, the routine 800 continues to operation 812 where a determination is made as to whether more string definition files 10 are available for insertion. If more files are available, the routine 800 continues to operation 813 where the next string definition file is designated. The routine 800 then returns to operation 808 described above. If all the files have received insertion, the routine 800 continues to operation 814 where a determination is made as to whether more destination languages are to be inserted. If not the routine 800 terminates at operation 818. If more languages are to be inserted the routine 800 continues to operation 814 where the next language for insertion is designated. The routine 800 then branches back to operation 806 described above.

If only missing strings are to be inserted at operation 806, the routine 800 continues from operation 806 to operation 820. At operation 820, a string definition file 10 is searched for character strings that are not represented by language tags and character strings for the current designated language. The routine 800 then continues to operation 822 where a determination is made as to whether there are missing or blank character strings for the current designated language. If character strings for the current designated language are missing from the string definition file 10, the routine 800 continues to operation 824 where the missing character strings for the language currently designated are copied from the intermediate text file 12 to the string definition file 10. The routine 800 then continues to operation 826 described below.

If there are no missing character strings, the routine 800 continues from operation 822 to operation 826. At operation 826 a determination is made as to whether more string definition files 10 are available for insertion. If more files are available, the routine 800 continues to operation 827 where the next string definition file is designated. The routine 800 then returns to operation 820 described above. If all the files have been searched for insertion, the routine 800 continues to operation 816 where a determination is made as to whether more destination languages are to be inserted. If not the routine 800 terminates at operation 818. If more languages are to be inserted, the routine 800 continues to operation 814 where the next language for insertion is designated. The routine 800 then branches back to operation 806 described above.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A method of extracting character strings from one or more string definition files into one or more intermediate text files in order to provide support for converting the character strings to multiple languages, the method comprising:
  - identifying one or more destination languages in which to convert the extracted character strings;
  - receiving a designation as to whether all character strings or only character strings not represented by one or more destination languages in the string definition files are to be extracted from the string definition files;
  - in response to an all character strings designation being received, copying into an intermediate text file for each destination language, a source language version of each character string and storing in each intermediate text file, a file identifier for each character string that identifies the string definition file from which each character string was extracted;
  - in response to an only character strings not represented designation being received, for each destination language, searching the string definition files for the source language version of each character string not represented by the destination language; and
  - in response to locating the source language version of each character string not represented by the destination language, copying into the intermediate text file for the destination language, the source language version of each character string not represented by the destination language of the intermediate text file in the string definition files and storing in each intermediate text file, a file identifier for each character string that identifies the string definition file from which each character string not represented was extracted.

2. A method of inserting from one or more intermediate text files into one or more string definition files, character strings converted into multiple languages, each intermediate text file representing a destination language in order to provide support for converting the character strings to multiple languages, the method comprising:
  - identifying one or more destination languages in which to insert the converted character strings;
  - for each destination language, receiving a designation as to whether all or only character strings not represented by the destination language in the string definition files are to be inserted from the intermediate text file for the destination language into the string definition files;
  - in response to an all character strings designation being received, copying into the string definition files, the converted character strings stored in the intermediate text files wherein each intermediate text file contains a file identifier for each character string that identifies the string definition file from which each character string originated and into which the converted character string is to be copied;
  - in response to an only character strings not represented designation being received, for each destination language, searching the string definition files for the character strings not represented by the destination language; and
  - in response to locating the character strings not represented by the destination language, copying from the intermediate text file for the destination language, each converted character string not represented by the destination language of the intermediate text file in the string definition files wherein each intermediate text file contains a file identifier that identifies the string definition file from which each character string originated and into which the converted character strings not represented are to be copied.

3. A method of providing one or more text displays in a plurality of languages within a computer wherein the text displays include one or more character strings, comprising:
  - representing the character strings within a string definition file for each text display;
  - receiving a designation of one or more destination languages;
  - extracting from one or more string definition files into one or more intermediate text files, the character strings in a source language to be converted to the destination languages wherein an intermediate text file is provided for each destination language, the extraction comprising:
    - identifying the designated destination languages,
    - for each destination language, determining whether all the character strings or only character strings missing from the string definition file in the destination language are designated to be extracted from the string definition files into the intermediate text file for the destination language,
    - in response to all the character strings being designated for extraction, searching each string definition file for a source language version of the character strings and copying into the intermediate text file for the destination language the character strings and the file identifier for each string definition file from which each character string was extracted, and
    - in response to only character strings missing from the string definition file in the destination language being designated for extraction, searching each string definition file for a source language version of the missing character strings and copying into the intermediate text file;
  - converting the character strings in the source language to the destination languages; and
  - utilizing the file identifiers to locate the string definition file from which the character string in the source language was extracted and inserting the converted character strings from the intermediate text files into the string definition file from which the character strings in the source language corresponding to the converted character strings were extracted.

4. A method of providing one or more text displays in a plurality of languages within a computer wherein the text displays include one or more character strings, comprising:
  - representing the character strings within a string definition file for each text display;
  - receiving a designation of one or more destination languages;
  - extracting from one or more string definition files into one or more intermediate text files, the character strings in a source language to be converted to the destination languages wherein an intermediate text file is provided for each destination language;
  - storing in the intermediate text files a file identifier for each string definition file from which each character string was extracted;
  - converting the character strings in the source language to the destination languages; and
  - utilizing the file identifiers to locate the string definition file from which the character string in the source language was extracted and inserting the converted character strings from the intermediate text files into the string definition file from which the character strings in the source language corresponding to the converted character strings were extracted, the insertion comprising:

identifying the designated destination languages, for each destination language, determining whether all the converted character strings or only the converted character strings missing from the string definition files in the destination language are designated to be inserted from the intermediate text file for the destination language into the string definition files, in response to all the converted character strings being designated for insertion, searching each intermediate text file for the converted character strings associated with the file identifier of each string definition file for insertion and copying from the intermediate text file for the destination language into the string definition files, the converted character strings associated with the file identifier for each string definition file for insertion, and in response to only character strings missing from the string definition files in the destination language being designated for insertion, searching each intermediate text file for the missing converted character strings associated with the file identifier of each string definition file for insertion and copying from the intermediate text file for the destination language into the string definition files, the missing converted character strings associated with the file identifier for each string definition file for insertion.

5. A computer-readable medium having computer-executable instructions stored thereon which, when executed by a computer, cause the computer to perform the method of claim 1.

6. A computer-readable medium having computer-executable instructions stored thereon which, when executed by a computer, cause the computer to perform the method of claim 2.

7. A computer-readable medium having computer-executable instructions stored thereon which, when executed by a computer, cause the computer to perform the method of claim 3.

8. A computer-readable medium having computer-executable instructions stored thereon which, when executed by a computer, cause the computer to perform the method of claim 4.

* * * * *